US011003801B2

(12) United States Patent
Matsumoto

(10) Patent No.: US 11,003,801 B2
(45) Date of Patent: May 11, 2021

(54) FUNCTIONAL DEVICE AND CONTROL APPARATUS

(71) Applicant: CANON KABUSHIKI KAISHA, Tokyo (JP)

(72) Inventor: Akihiro Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 15/361,677

(22) Filed: Nov. 28, 2016

(65) Prior Publication Data

US 2017/0161523 A1  Jun. 8, 2017

(30) Foreign Application Priority Data

Dec. 4, 2015 (JP) .............................. JP2015-237803

(51) Int. Cl.
*G06F 21/70* (2013.01)
*G06F 21/60* (2013.01)

(52) U.S. Cl.
CPC .............. *G06F 21/70* (2013.01); *G06F 21/60* (2013.01)

(58) Field of Classification Search
CPC ........... G06F 21/60; G06F 21/70; G06F 21/72
See application file for complete search history.

(56) References Cited

U.S. PATENT DOCUMENTS

| 4,800,523 | A | 1/1989 | Gerety et al. ................. 364/900 |
| 8,380,985 | B2 * | 2/2013 | Sato ........................ H04L 63/06 713/155 |
| 8,510,544 | B2 * | 8/2013 | Takayama ............. G06F 21/575 713/1 |
| 8,776,182 | B2 * | 7/2014 | Berg ....................... G06F 21/575 726/3 |
| 9,667,616 | B2 * | 5/2017 | Kobayashi ............ H04L 9/3268 |
| 9,716,708 | B2 * | 7/2017 | Love .................... G06F 21/6218 |
| 2002/0018380 | A1 | 2/2002 | Shinmori ....................... 365/200 |
| 2004/0073837 | A1 | 4/2004 | Mizuta et al. .................. 714/28 |
| 2004/0184339 | A1 | 9/2004 | Ozawa ..................... 365/230.03 |
| 2005/0242924 | A1 | 11/2005 | Yosim et al. ................ 340/5.74 |

(Continued)

FOREIGN PATENT DOCUMENTS

| CN | 85109213 | 8/1986 |
| CN | 102037473 | 4/2011 |

(Continued)

OTHER PUBLICATIONS

Office Action dated Dec. 30, 2019 in counterpart Chinese Application No. 201611104578.7, and English translation thereof.

(Continued)

*Primary Examiner* — Dao Q Ho
(74) *Attorney, Agent, or Firm* — Venable LLP

(57) ABSTRACT

A functional device which surely prevents tampering performed through an external interface in the functional device comprising an external interface which is accessible to an internal functional component is provided. In the functional device, a coupling controller is provided between an external Flash terminal which is an external interface and an internal Flash memory. The coupling controller physically blocks between the external Flash terminal and the internal Flash memory after a Fuse is disconnected except for a case where a certification result in a REG maintains validity. The certification result is validated only while current is carried.

15 Claims, 11 Drawing Sheets

(56) References Cited

U.S. PATENT DOCUMENTS

| | | | |
|---|---|---|---|
| 2006/0184799 A1* | 8/2006 | Seo | G06F 21/79 713/182 |
| 2008/0163362 A1 | 7/2008 | Sesumi | 726/19 |
| 2010/0199077 A1 | 8/2010 | Case et al. | 713/1 |
| 2011/0066838 A1 | 3/2011 | Takayama et al. | 713/2 |
| 2014/0026193 A1 | 1/2014 | Saxman et al. | 726/4 |
| 2015/0082420 A1 | 3/2015 | Love et al. | G06F 21/30 |

FOREIGN PATENT DOCUMENTS

| | | |
|---|---|---|
| CN | 102932949 | 2/2013 |
| CN | 104620250 | 5/2015 |
| JP | 2002-032267 | 1/2002 |
| JP | 2002-183108 | 6/2002 |
| JP | 2004-086525 | 3/2004 |
| JP | 2004-288257 | 10/2004 |
| JP | 2007-535050 | 11/2007 |
| JP | 2008-165534 | 7/2008 |
| JP | 2011-123727 A | 6/2011 |

OTHER PUBLICATIONS

Office Action dated Oct. 8, 2019 in counterpart Japanese Application No. 2015-237803, together with English Translation thereof.

\* cited by examiner

| | COMMAND NAME | FUNCTION | CR | FR | TYPE |
|---|---|---|---|---|---|
| 606 | SetUp | SETUP PROCESSING | F0 | 01 | P0 |
| 607 | InstallSecret | SECRET INFORMATION SETTING | F0 | 02 | P0 |
| 608 | CrossCertificationHD | CROSS CERTIFICATION H→D | F0 | 03 | P0 |
| 609 | CrossCertificationDH | CROSS CERTIFICATION D→H | F0 | 04 | PI |
| 610 | RegisterTerminalID | REGISTER TERMINAL CERTIFICAITON ID | F0 | 05 | P0 |
| 611 | CertifyTerminal | CERTIFY TERMINAL | F0 | 06 | P0 |
| 612 | GetStatus | GET STATUS INFORMATION | F0 | 07 | PI |
| 613 | GetIdentify | GET IDENTIFICATION INFORMATION | F0 | 08 | PI |

FUNCTIONAL DEVICE AND CONTROL APPARATUS

BACKGROUND OF THE INVENTION

Field of the Invention

The present disclosure relates to a functional device comprising a security function and a control apparatus.

It is general in an information processing apparatus which can be connected to a network to mount a functional device comprising a security function such as certification processing, encryption processing to secret information and the like. The security function is also required in relation to a peripheral device which is connected to the information processing apparatus. For example, Japanese Patent Application Laid-open No. 2011-123727 discloses a system in which a certification device is interposed between a control device and the peripheral device. In this system, a key identifier and encryption key data corresponding to the peripheral device are stored. When a command for certification relating to a use request of the peripheral device is detected by the control device, a key is specified from certification data and identification information of a related device included in the command for certification. Thereafter, the certification processing is executed using the certification data and the encryption key data and corresponding to the specified key. When the certification processing is successful, the peripheral device is made into an operable state through a physical input/output port which connects the peripheral device. Thus, tampering of the security information of the control device or the peripheral device can be prevented.

There is a physical external interface port which connects the certification apparatus and the peripheral device in the system disclosed in Japanese Patent Application Laid-open No. 2011-123727. Usually, the external interface is essential when checking the final operation of the apparatus. However, if a signal itself which is input into the external interface is camouflaged by a high-skilled person, security may be broken. For example, if an unauthorized person accesses an internal functional component connected to the external interface, there is a danger that secret information stored in the internal functional component may be tampered or destroyed.

The main object of the present disclosure is to provide a functional device capable of protecting the secret information from the danger and a control apparatus mounting the same.

SUMMARY OF THE INVENTION

A functional device having a functional component according to the present disclosure includes: an external interface which enables an external access; a first interface which is conducted with the external interface; a second interface which is conducted with the functional component; a first memory device that stores a set of instructions; and at least one first processor that executes the instructions to control a first controller to physically conduct the first interface and the second interface in a case where predetermined certification processing is successful.

Further features of the present invention will become apparent from the following description of exemplary embodiments (with reference to the attached drawings).

BRIEF DESCRIPTION OF THE DRAWINGS

FIG. 6 is an explanatory diagram of an expansion command group in accordance with a SATA standard.

DESCRIPTION OF THE EMBODIMENTS

In the following, a description is provided with regard to embodiments of the present disclosure.

Figure 1:
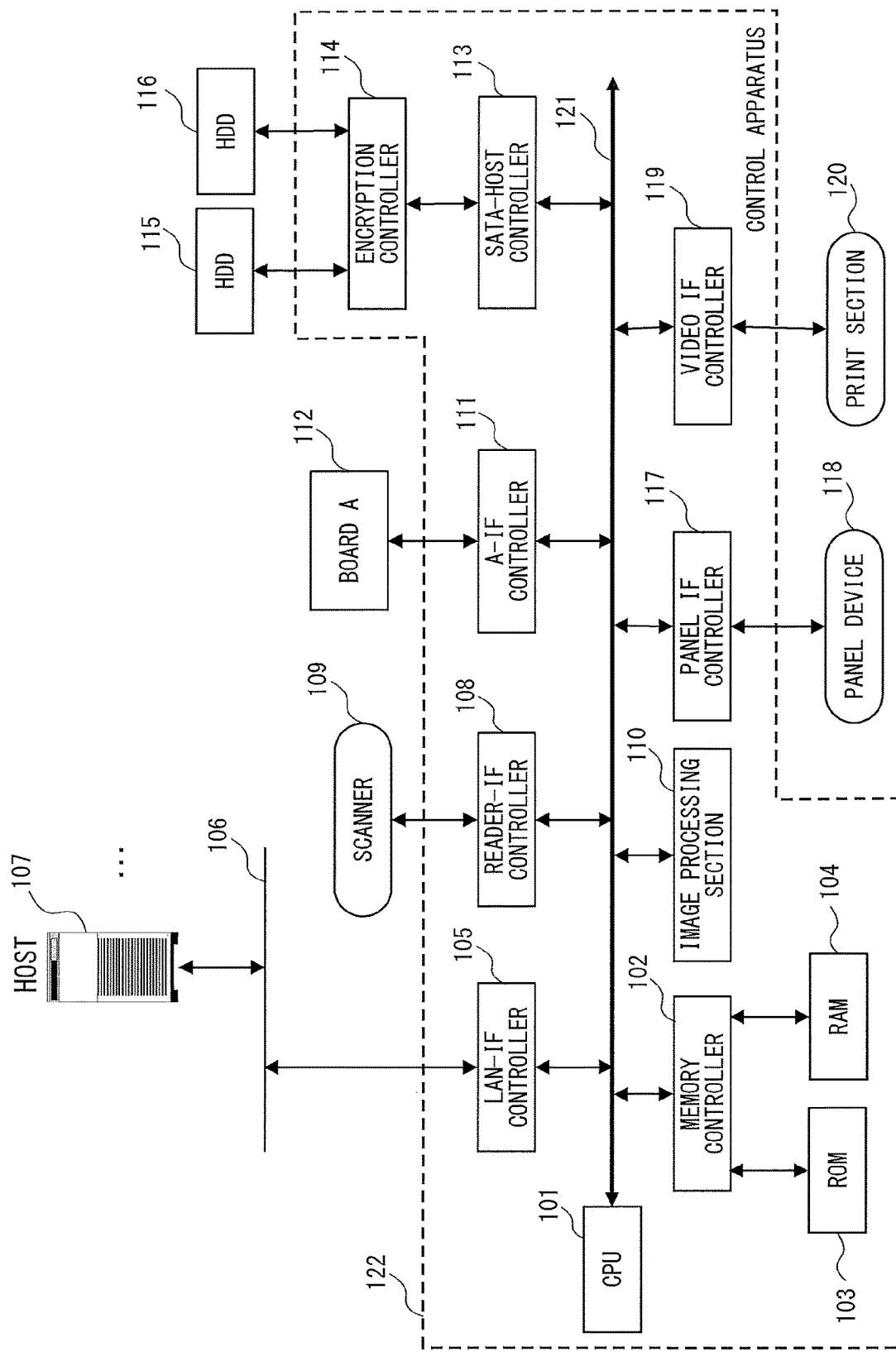
FIG. 1 is a configuration diagram of the control apparatus according to the present embodiment.

FIG. 1 is an overall configuration diagram of an image forming system according to the present disclosure. The image forming system comprises a control apparatus 122 which includes one or more functional components or functional devices. The control apparatus 122 comprises a computer which has a central processing unit (CPU) 101, a read only memory (ROM) 103 and a random access memory (RAM) 104. The ROM 103 and the RAM 104 are connected to the CPU 101 through a memory controller 102 and a bus 121. A control bus, a data bus, and a local bus between arbitrary blocks are collectively expressed as the bus 121 for convenience. A typical example of the bus 121 includes PCI Express or "PCIe". The bus 121 is also connected to an image processing section 110. Moreover, the bus 121 is also connected to a LAN-IF controller 105, a Reader-IF controller 108, an A-IF controller 111, a SATA-Host controller 113, a panel IF controller 117 and a video IF controller 119. It is noted that the "IF" is a general term of an information input/output interface including a terminal, a connector, a cable and other connecting tools.

The CPU 101 performs total control of the operation of the control apparatus 122 by executing a predetermined computer program. The memory controller 102 performs input/output control to/from the ROM 103 and RAM 104. The memory controller also performs direct memory access (DMA) control. The ROM 103 is a read only memory. A typical read only memory is a Flash memory. A basic input/output system (BIOS) program, a control parameter and the like are stored in the ROM 103. By connecting the Flash memory, on-board rewriting is enabled. The RAM 104 is a memory used exclusively for rewriting, which is, for example, a double-data-rate (DDR) memory. The RAM 104 is used as a work area of a program. It is also used to store print data.

The LAN-IF controller 105 performs input/output control of data with a network 106. A protocol is, for example, applicable to TCP/IP (Transmission Control Protocol/Internet Protocol). The network 106 is connected to a network compatible device such as a HOST computer 107, which enables to perform image formation via a network. The network 106 can also be connected to the internet through a router which is not shown. The Reader-IF controller 108 performs the input/output control with a scanner 109. By printing input image data which is scanned by the scanner 109, a copy function is realized. An image processing section 110 performs various image processing on an image taken through the LAN-IF controller 105 and the Reader-IF controller 108.

The panel IF controller 117 performs the input/output control with a panel device 118 which is operated by a user. Though not shown in FIG. 1, by operating a screen, a button image and the like which are displayed as a user interface (UI) of the panel device 118, it is possible to check various settings and states relating to the image formation. The video IF controller 119 transfers print data and performs communication control of command/status with a print section 120. The print section 120 is a functional block which performs the image formation. Though not shown in detail, the print section 120 consists of a printing apparatus main body and a sheet feeding system and a sheet delivery system. In accordance with command information mainly from the video IF controller 119, the print section 120 prints the print data on a paper medium and the like.

The A-IF controller 111 performs the input/output control with a board A 112. The board A 112, connected to the control apparatus 122, is a functional component which exhibits a predetermined function. In this embodiment, the board A 112 is a functional component on which a non-volatile storage device such as the Flash memory is mounted. For example, the board A 112 is used to store a boot program of an image forming system, to store information which is unique to the print section 120 (such as individual identification data, consumable article information and the like) and the like. The SATA-Host controller 113 performs the input/output control of data with a device comprising an IF which is in compliance with a serial advanced technology attachment (SATA) standard.

An encryption controller 114 performs the input/output control and mirroring control with the non-volatile storage device to be connected while performing encryption processing and decryption processing to write data and read data to/from the non-volatile storage device. The non-volatile storage device used here is, for example a hard disk drive (HDD) or a solid state drive (SSD). The mirroring control means control which performs the encryption processing and the decryption processing as mentioned using at least two non-volatile storage devices or more. In this embodiment, the mirroring control is performed using two HDDs, HDD 115 and HDD 116. One HDD 115 is referred to as a master HDD and the other HDD 116 is referred to as a back up HDD. In the mirroring control, data stored in the master HDD 115 is copied to the back up HDD 116. When writing, encryption data is written in both the master HDD 115 and the back up HDD 116. When reading, the encryption data is read from the master HDD 115, which is then decrypted. The decrypted data is then transmitted to the SATA-Host controller 113 of a request source.

The encryption controller 114 can be configured as a functional device mounting an IC which is accommodated in one package. In this case, a hardware configuration of the image forming system is more simplified. So, hereinafter, the encryption controller 114 is expressed as "security IC" which is an example of the functional device. Further, among the control apparatus 122, the CPU 101 and a main controller can be configured by the functional device mounting the IC which is accommodated in a package. In the following description, the functional device is referred to as a "controller device" or a "controller IC". In the example shown in FIG. 1, the main controller is a memory controller 102, the LAN-IF controller 105, the Reader-IF controller 108, the image processing section 110, the A-IF controller 111, the SATA-Host controller 113, the panel IF controller 117, and the video IF controller 119.

Figure 2:
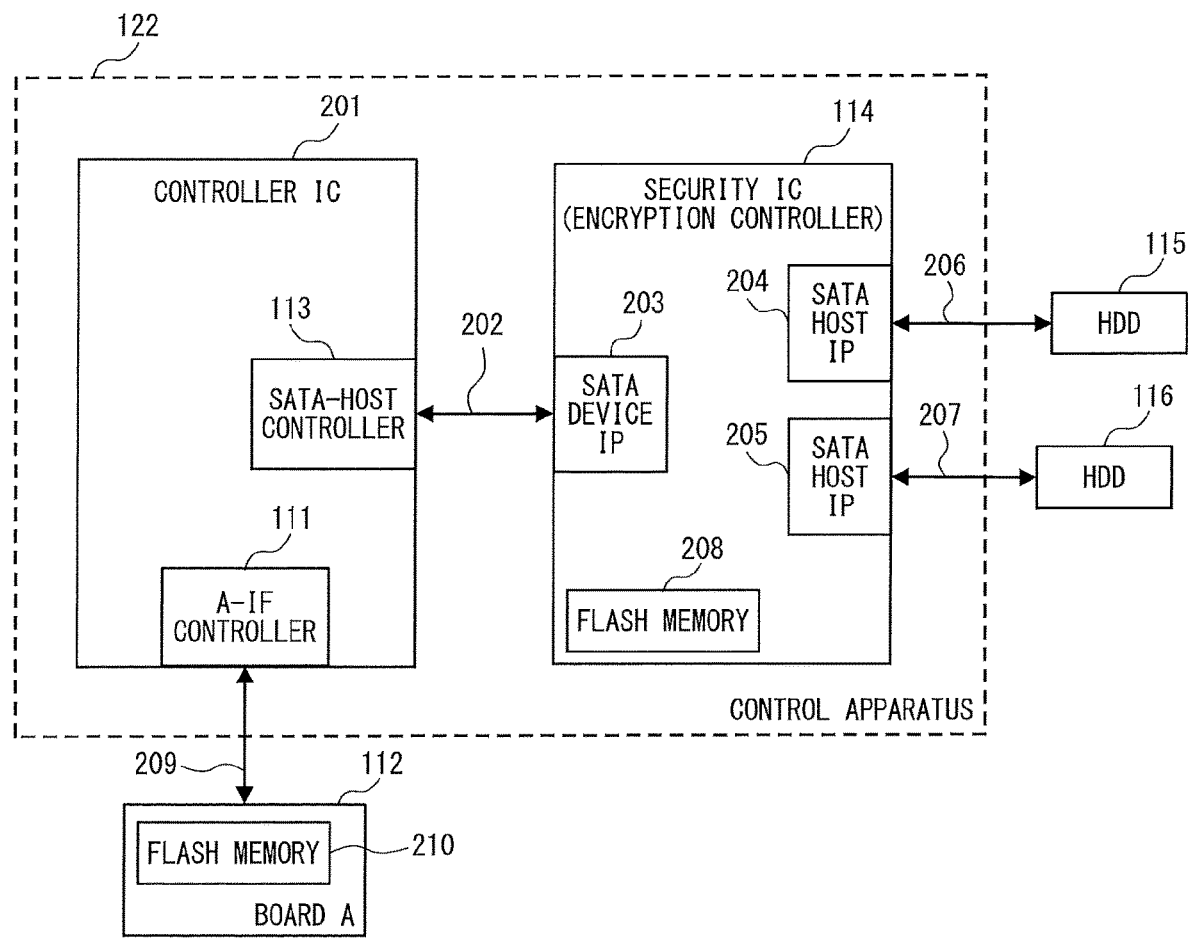
FIG. 2 is an explanatory diagram showing a connection state in a case where the control apparatus is composed of the functional device.

FIG. 2 is a configuration diagram showing connection between the controller IC and the security IC. FIG. 2 also shows connection between the controller IC and its peripheral device and connection between the security IC and its peripheral device. As the peripheral device, the board A 112, the HDD 115 and HDD 116 are illustrated. The security IC 114 includes a SATA-Device-IP 203 and SATA-Host-IPs 204 and 205. The SATA-Device-IO 203 is connected to the SATA-Host controller 113 of the controller IC 201 through a SATA-IF 202. The SATA-Host-IP 204 is connected to the HDD 115 through a SATA-IF 206. Further, the SATA-Host-IP 205 is connected to the HDD 116 through a SATA-IF 207.

Installed in the security IC 114 is a Flash memory 208 which is a functional component in which unique information is stored. The Flash memory 208 is a single tip die which is independently provided from the chip die of other functional block (sometimes referred to as "user die"). It means that the security IC 114 has a system in package (SiP) configuration in which two chips are installed in one package.

The controller IC 201 is connected to the A-IF controller 111 and the board A 112 through the A-IF 209. A Flash memory 210, which is a functional component, is implemented on the board A 112. The Flash memory 210 reads and stores identification data stored in the Flash memory 208 of the security IC 114. The details will be described later.

Figure 3:
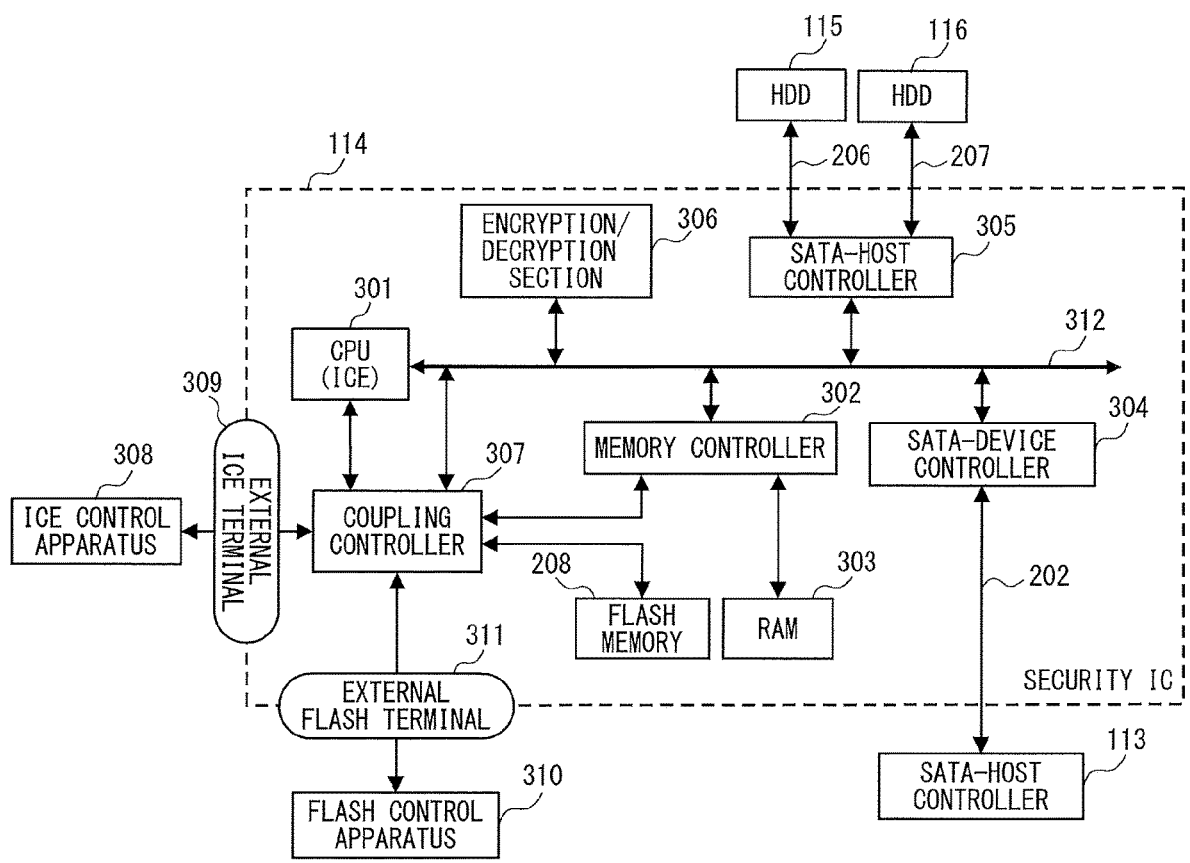
FIG. 3 is a block configuration diagram of a security IC.

FIG. 3 is an internal functional configuration diagram of the security IC 114. The security IC 114 comprises a CPU 301 which is connected to a control bus 312. By executing a predetermined encryption/decryption program, the CPU 301 performs SATA-IF control, the encryption/decryption control, the mirroring control as mentioned and the like. Further, by executing a predetermined ICE program, the CPU 301 comprises an ICE (In Circuit Emulator) function as a debugger for program development. Further, by executing a predetermined program for certification, the CPU 301 functions as a certification unit.

The control bus 312 is also connected to a memory controller 302. The memory controller 302 performs the input/output control of data to the Flash memory 208 and a RAM 303. In the Flash memory 208, various programs used to perform certification processing, the encryption processing and the mirroring control are stored. Also, certification information required for performing the input/output control of data, secret information such as original data for generating the encryption key, various control parameters and the like are stored in the Flash memory 208. The RAM 303 is used for a work area of the program. It is also used to temporarily store data.

The control bus 312 is also connected to a SATA-Device controller 304. The SATA-Device controller 304 includes the SATA-Device-IP 203 as shown in FIG. 2 and its peripheral circuit. The SATA-Device controller 304 performs the input/output control of the command/status and various data with the SATA-Host controller 113 through the SATA-IF 202.

The control bus 312 is also connected to a SATA-Host controller 305. The SATA-Host controller 305 includes the SATA-Host-IPs 204 and 205 as shown in FIG. 2 and their peripheral circuits. The SATA-Host controller 305 performs the input/output control of the command/status and various data through the HDD 115 and HDD 116 and SATA-IFs 206 and 207. The control bus 312 is also connected to an encryption/decryption section 306. The encryption/decryption section 306 performs the encryption/decryption processing to the write and read data to the HDD 115 and HDD 116.

The control bus 312 is also connected to a coupling controller 307 which functions as a coupling control unit between the interfaces. As mentioned, the encryption/decryption program and the secret information are stored in the Flash memory 208. With the SiP configuration in which the Flash memory die and the user die are installed in one package, leakage and tampering of the secret information are more surely prevented as compared to placing the Flash memory 208 outside as a single device. However, if the Flash memory 208 is sealed inside the security IC 114, to perform a shipping test when supplying the Flash memory 208, an external terminal for accessing the Flash memory 208 is required. The external terminal is shown as an external Flash terminal 311 in FIG. 3. Providing such external terminal results in a security hole. For example, in a case where the external Flash terminal 311 is provided, a Flash control apparatus 310 is connected to the external Flash terminal 311, which make it possible to attempt to access the certification program and the secret information stored in the Flash memory 208. In this case, a high-skilled person with no legitimate authority may decrypt certification algorithm, which results in revealing the certification information and the like. Due to the same reason, an external ICE terminal 309 to which an ICE control apparatus 308 is connected may be the security hole. To fix such security hole, the coupling controller 307 is provided.

Figure 4:
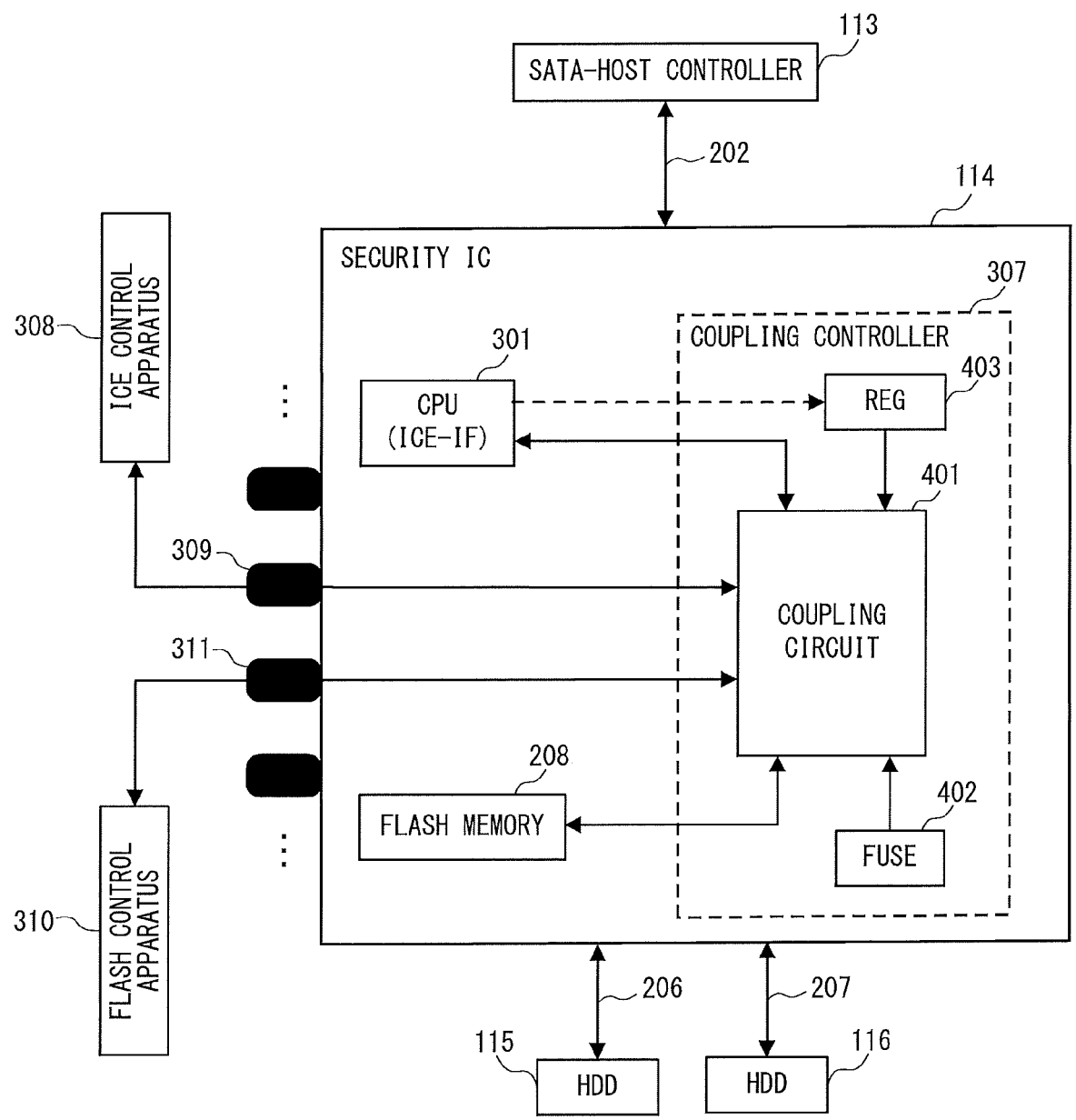
FIG. 4 is an explanatory diagram showing a connection state of a coupling controller and its main peripheral components.

FIG. 4 is a diagram showing a connection state of the coupling controller 307 and its main peripheral parts among the security IC 114. The security IC 114 is provided with the external ICE terminal 309, the external Flash terminal 311 and the like as an external interface. Moreover, the security IC 114 is connected to the SATA-Host controller 113 (see FIG. 3) through the SATA-IF 202. Moreover, the security IC 114 is connected to the HDD 115 and HDD 116 respectively through the SATA-IFs 206 and 207. The coupling controller 307 is interposed between the external interface and an external device which is connected to the internal functional component such as the Flash memory 208 and the security IC 114 (for example, HDDs 115, 116, SATA-Host controller 113). Then, based on an output of a Fuse 402 and a REG 403, the external interface and the external device are turned into a coupled state or a non-coupled state by a coupling circuit 401. The coupling circuit 401 is interposed between a first interface a second interface, the first interface being conducted with the external interface and the second interface being conducted with the Flash memory 208 and the memory controller 302. The coupling circuit 401 is also interposed between the first interface and a third interface, the third interface being conducted with the control bus 312 to which the external device is connected.

The Fuse 402 is a component including a known fuse which is disconnected in an overcurrent state. The Fuse 402 forms a first value state (Logical High: "1") before it is disconnected. When it is disconnected, the Fuse 402 releases the state. It means that the Fuse 402 functions as an irreversible unit which irreversibly forms the first value state ("1"). On the other hand, the REG 403 is a register which functions as a reversible unit which reversibly forms the first value state and a second value state (Logic Low: "0") in accordance with a certification result by the certification unit. The REG 403 maintains the first value state ("1") only for a period during which the certification result maintains validity. The first value state ("1") is reset when current carrying to the security IC 114 is stopped. Then, the state of the REG 403 is turned into the second value state ("0"). It means that the first value state ("1") is validated only while current is carried to the security IC 114.

Figure 5A:
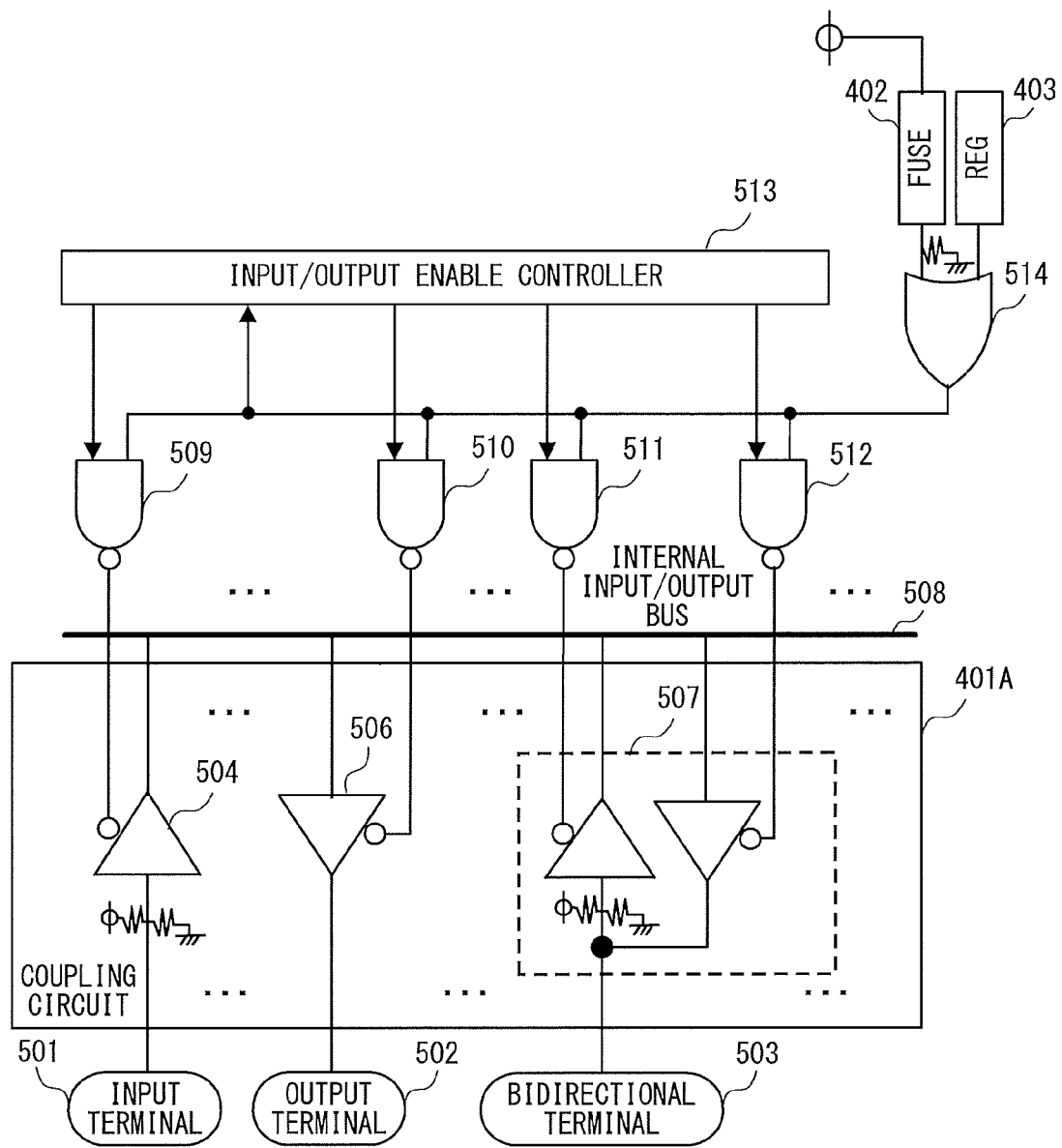
FIG. 5A and FIG. 5B are diagrams illustrating a configuration example of a coupling circuit.
Figure 5B:
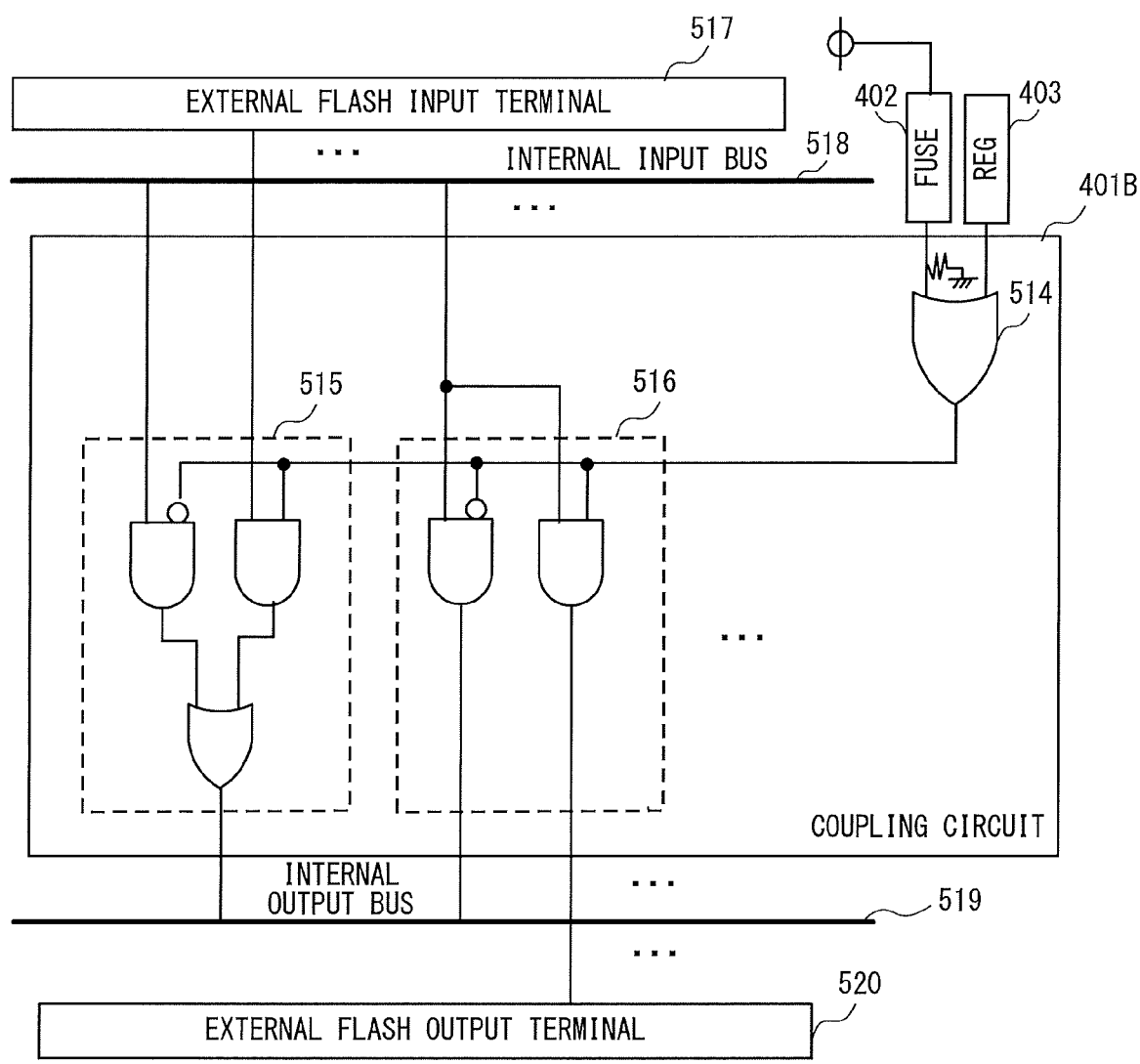

FIG. 5A and FIG. 5B show examples of the configuration of the coupling circuit 401, the Fuse 402, and the REG 403 in the coupling controller 307. The coupling circuit 401 is referred to as a coupling circuit 401A in FIG. 5A. Also, the coupling circuit 401 is referred to as a coupling circuit 401B in FIG. 5B. FIG. 5A is a circuit configuration example in a case where a three-state bus can be implemented. The first interface which is conducted with the external interface consists of an input terminal 501, an output terminal 502 and a bidirectional terminal 503. The input terminal 501 is conducted and connected to an input buffer 504 of the coupling circuit 401A. The output terminal 502 is conducted and connected to an output buffer 506. The bidirectional terminal 503 is conducted and connected to a bidirectional buffer 507. A pull-up resistor or a pull-down resistor is connected to an input side of the input buffer 504. In accordance with a characteristic of a signal, the appropriate one is added (the same applies to the bidirectional buffer 507). Moreover, input/output of each buffer is connected to an internal input/output bus 508 which also serves as the second interface and the third interface. The internal input/output bus 508 is connected to the Flash memory 208, the CPU 301, the memory controller 302, and the control bus 312 shown in FIG. 3. It means that an internal input/output signal is transmitted to the internal input/output bus 508.

The buffers 504, 506, and 507 are a three-state buffer. When the three-state buffers 504, 506, and 507 are open, the first interface and the second interface (and the third interface) are turned into the non-coupled state. Moreover, when the three-state buffers are closed, the first interface and the second interface (and the third interface) are turned into the coupled state. Whether to open or close each of the three-state buffers 504, 506, and 507 is controlled by an enable signal which is connected to an enable terminal of each of the three-state buffers 504, 506, and 507. The enable signal is controlled by an input/output enable controller 513 which is realized by the CPU 301.

The coupling controller 307 comprises an OR circuit 514 which is an example of a binary circuit. An input of the OR circuit 514 is connected to signal lines from the Fuse 402 and the REG 403. Then, when at least one of the Fuse 402 and the REG 403 generates "1" signal, the "1" signal is output. Otherwise, "1" is turned into "0". In the example of FIG. 5A, the signal is called a mask signal. The mask signal is input to NAND circuits 509, 510, 511, and 512. When the mask signal is "1", a gate of the NAND circuits 509, 510, 511, and 512 opens. Then, the enable signal which is input from the input/output enable controller 513 is validated. It means that the first interface and the second interface are turned into the coupled state. At this time, the first interface and the third interface are also turned into the coupled state. Otherwise, the first interface and the second interface are turned into the non-coupled state by the coupling controller 307. Also, the first interface and the third interface are turned into the non-coupled state by the coupling controller 307. It means that the coupling controller 307 physically blocks between the interfaces. That is, except for a case where a predetermined condition is satisfied, the first interface and the second interface are turned into a physically non-coupled state.

For example, in case of the configuration shown in FIG. 5A, for a period during which the mask signal which is output from the OR circuit 514 is not "1", all operations of the buffers 504, 506, and 507 are stopped. Thereby, the internal input/output bus 508 and the input terminal 501, the internal input/output bus 508 and the output terminal 502 and the internal input/output bus 508 and the bidirectional terminal 503 are all turned into the non-coupled state. As a result, the external Flash terminal 31 becomes non-conductive with the Flash memory 208. So, even the unauthorized person attempts to make an external access through the external Flash terminal 311 to the Flash memory 208, which is impossible.

The coupling circuit 401 can also be used as a circuit which selects or distributes an input destination and an output destination. FIG. 5B shows a circuit configuration example in a case where the output destination of a signal which is input through the external access and a signal generated inside the security IC 114 are selected or distributed. The signal which is output from the OR circuit 514 in this case is called a select signal. A multiplexer (for selection) 515 determines (selects) which signal, for example, a signal which is input from the external Flash input terminal 517 or a signal which is input from an internal input bus 518 to be input into an internal output bus 519. The internal input bus 518 is connected, for example, to the memory controller 302. The internal output bus 519 is connected, for example, to the Flash memory 208. In a case where the select signal which is output from the OR circuit 514 and input into the multiplexer 515 is "1", the external Flash input terminal 517 is determined and the input signal from, for example, the Flash control apparatus 310 is selected as the input signal. On the other hand, in a case where the select signal is not "1", i.e., the select signal is "0", the signal which is input from the internal input bus 518, for example, the signal which is input from the memory controller 302 is selected.

A demultiplexer 516 (for distribution) determines which one, for example, an external Flash output terminal 520 or the memory controller 302, to distribute the signal which is output from the Flash memory 208. In a case where the select signal is "1", the signal is distributed to the external Flash output terminal 520 (that is, the output signal to the Flash control apparatus 310). On the other hand, in a case where the select signal is not "1", i.e., the select signal is "0", the signal is distributed as the output signal to the memory controller 302. Thereby, for a period during which the select signal is "1", the external Flash output terminal 520 (the first interface) and the functional component which is connected to the second interface are turned into the coupled state.

Figure 8:
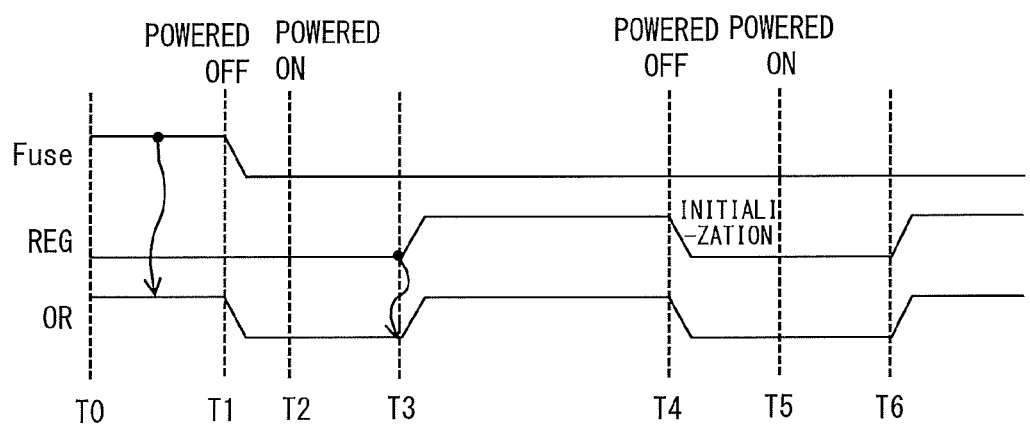
FIG. 8 is a time chart of operation in the coupling controller.

Here, a description is provided with regard to timing when the external Flash input terminal 517 and the Flash memory 208 are turned into the coupled state or non-coupled state in accordance with a level of the signal ("1"/"0") which is output from the OR circuit 514. FIG. 8 is a time chart showing relation with the Fuse 402 and the REG 403 which are input into the OR circuit 514 and the select signal which is output from the OR circuit 514. A lateral axis represents a time axis when a voltage is applied to the security IC 114. With a certain time T0 as a base point, from T0 to T1, the Fuse 402 is not disconnected. It means that the select signal which is output from the OR circuit 514 (described as "OR") maintains "1", meaning that the external Flash output terminal 520 and the Flash memory 208 are in the coupled state. At time T1, the power is turned OFF. Immediately after disconnecting the Fuse 402, the power is turned ON at time T2. In this case, the output of both the Fuse 402 and the REG 403 is "0". Thereby, the select signal which is output from the OR circuit 514 is also "0" level so that the external Flash output terminal 520 and the Flash memory 208 are turned into the non-coupled state. It means that the external Flash output terminal 520 and the Flash memory 208 are turned into a physically blocked state. Immediately before time T3, the certification result by the certification unit which is described later is validated. Then, the REG 403 is shifted to "1" and the select signal which is output from the OR circuit 514 is shifted to "1".

From times T4 to T6, the select signal immediately before is "1". At the time T4, the power is turned OFF. At the time T5, the power is turned ON again. At the time T6, the REG 403 is signal shifted to "1". The select signal at the time T3 is "1" though, due to the power OFF at the time T4, the REG 403 is initialized. Thereby, from the time T5 at which the power is turned ON again to immediately before the time T6, the select signal is in the state of "0". Thereby, the external Flash output terminal 520 and the Flash memory 208 are again in the physically blocked state. At the time T6, the certification is performed by the certification unit. When the REG 403 turns to the state of "1" (when the certification is successful), the select signal also turns to "1" so that the external Flash output terminal 520 and the Flash memory 208 are again turned into the physically connected state. As mentioned, in the present embodiment, while the power is ON and after the Fuse 402 is disconnected, when the REG 403 is turned into the state of "1" by the certification unit which is described later, the external interface and the internal functional component are turned into the coupled state. Note that the coupled state is maintained until when the security IC 114 is powered OFF.

Next, a description is provided with regard to a data transfer with the security IC 114 and the external device and the peripheral device. As mentioned, the SATA-IF 202 is only a connection interface between the controller IC 201 and the security IC 114 on the control apparatus 122 and no side band signal is generated. Thereby, all the data transfers with the security IC 114 are performed via the SATA-IF 202. In particular, the data transfer is performed by transmitting/receiving command/status packet. In this embodiment, transmitting/receiving of the command/status packet is performed using an expansion command which is an own definition in the SATA standard.

FIG. 6 shows an example of the expansion command in the SATA standard. In the SATA standard, an empty command which does not define contents of the command is prepared other than those defined as the standard such as a read command and a write command. In this embodiment, by giving the original definition to the empty command, transmitting/receiving of the command/status packet is performed. A table shown in FIG. 6 consists of a command name 601, function 602, CR 603, FR 604, and TYPE 605.

The CR 603 represents "Command Register". The FR 604 represents "Features Register". The TYPE 605 represents a transfer type. The CR 603 and the FR 604 are called a task register in the SATA standard, which is defined as a register at a predetermined position in a packet. A command number defined in the SATA standard must be set in the CR 603. In the table shown in FIG. 6, "F0" is described in a row of the CR 603. This represents the number indicating the undefined command. The FR 604 represents a command number of the expansion command which is originally defined as a sub-command number. From a top of the row of the command name 601, "01" to "08" are defined in order. It means that the command number for the SetUp (SU) command 606 is "01". Further, the command number for the InstallSecret (secret information setting: IS) Command 607 is defined as "02". Thereafter, from "03" to "08", the FR 604 is defined. It is noted that, when implementing, the "F0" is recognized as "F0h" and "01" to "08" are recognized as "01h" to "08h". Abbreviations written in the row of the TYPE 605, such as PO and PI, are symbols indicating the transfer type defined in the SATA standard. Based on a host, the type is classified whether it is Out (write system) or In (read system) and whether the packet accompanies data or not.

In the symbol written in the row of the TYPE 605, PO is defined as a PIO-out transfer protocol and PI is defined as a PIO-in transfer protocol. Both the PO and the PI are the transfer types accompanying data. In a case where no data is accompanied (that is, only a register value), ND, i.e., Non-Data transfer protocol is defined. Detailed contents of each expansion command are omitted but a brief description is provided with regard to a part of the expansion command, the function 602. Further, in the following description, in a case where each expansion command is specified, the abbreviation shown in brackets is used.

In the following, the command name 601 is particularly described. In this embodiment, the SetUp (SU) command 606 is used when various settings of the security IC 114 are performed from the controller IC 201. Items to be set include, for example, validity/invalidity setting of an encryption function and a mirroring function, setting of time-out time when an error occurs. An IS command 607 is a command which prompts to set the secret information. A CrossCertification HD (CCHD) command 609 and a Cross-Certification DH (CCDH) command 609 are used to perform cross certification between the controller IC 201 and the security IC 114. The cross certification is performed using a challenge and response system. A RegisterTerminal ID command (RT) 610 is a command which prompts to register a certification ID candidate, i.e., it is a registration command. A CertifyTerminal command (CT) 611 is a terminal certification command. A GetStatus command (GS) 612 is a command which prompts to get status information inside the security IC 114. For example, through the Get Status command, it is possible to get status of the HDD 115 and HDD 116 to be connected. It is also possible to get contents of an error when it occurs. A GetIdentify (get identification information: GI) command 613 is a command which prompts to get identification information which is individually generated inside the security IC 114.

Figure 7:
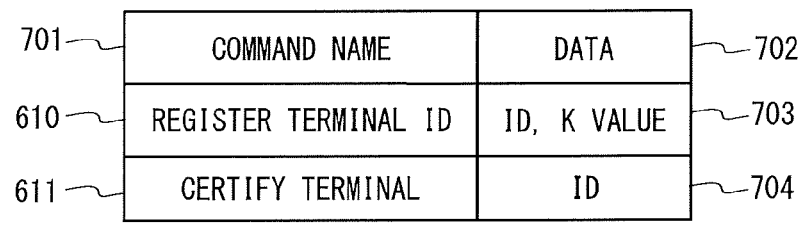
FIG. 7 is a detailed explanatory diagram of an expansion command.

FIG. 7 additionally explains the RT command 610 and the CT command 611. The PO, the transfer type of both commands, accompanies a data packet 702. It means that after a command packet 701 is transmitted, the data packet 702 is transmitted. For example, the certification ID candidate desired to register and a K value which represents a hash value are transmitted to a data packet 703 accompanying the RT command 610 which is the registration command of the certification ID candidate. The certification ID candidate is a candidate of the certification ID which is the identification information for identifying the external interface (for example, the external Flash terminal 311) which receives the external access. The K value is a unique value (a first unique value) which is derived from a hash function. The certification ID candidate used when performing external terminal certification processing is transmitted to a data packet 704 accompanying the CT command 611. As mentioned, through the expansion command which is issued from the controller IC 201, various settings, certification, getting status and the like to the security IC 114 are controlled.

Figure 9:
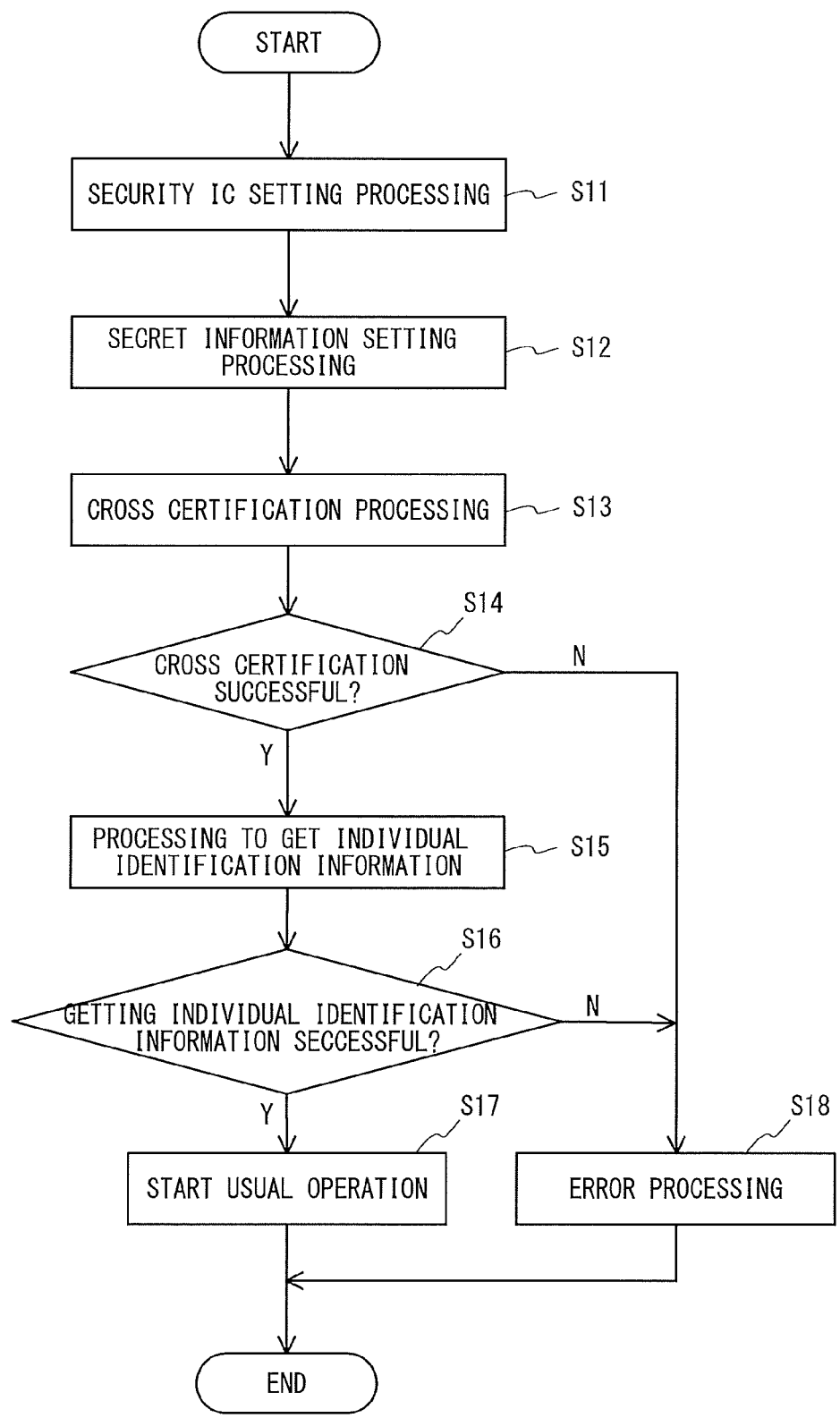
FIG. 9 is a diagram for explaining procedures of initialization processing in the security IC.

Next, an operation example of the control apparatus 122 is described. FIG. 9 is a diagram for explaining procedure of initialization processing performed by the controller IC 201 when the apparatus is started to use. In the controller IC 201, the CPU 101 performs the initialization processing. When the initialization processing is performed, the CPU 301 performs corresponding processing on the security IC 114 side. Referring to FIG. 9, the CPU 101 performs setting processing of the security IC 114 (Step S11). In particular, the CPU 101 defines a predetermined set value in the SU (Set Up) command 606 shown in FIG. 6 and transmits this to the CPU 301. The CPU 301 of the security IC 114 which received the SU command 606 performs its own setup in accordance with the contents defined in the SU command 606. Moreover, the CPU 301 generates physical random number, generates individual identification information which is individually unique and stores this in a predetermined place of the Flash memory 208 as one of the unique information. The individual identification information is used to certificate the original data for generating the encryption key. The individual identification information is also used to certificate when registering the certification ID candidate.

Thereafter, the CPU 101 performs the secret information setting processing (Step S12). It means that the CPU 101 defines the secret information in the IS command 607 shown in FIG. 6 and transmits this to the CPU 301. The CPU 301 which receives the IS command 607 stores the secret information in a predetermined place of the Flash memory 208. Then, using the CCHD (Cross Certification H→D) command 608 and the CCDH (Cross Certification D→H) command 609, the CPU 101 performs the cross certification processing with the CPU 301 using, for example, the challenge and response system (Step S13). If the cross certification fails (Step S14: N), the CPU 101 executes appropriate error processing (Step S18) and ends the initialization processing. General error processing can be used for the error processing. On the other hand, the CPU 301 blocks transfer of a command which is normally accessible through the SATA-IF 202.

At the Step S14, if the cross certification is successful (Step S14: Y), the CPU 101 transmits the GI command 613 to the CPU 301. The CPU 301 which receives the GI command 613 attempts to get the individual identification information from a predetermined place of the Flash memory 208 (Step S15). If the CPU 301 fails to get the individual identification information (Step S16: N), the CPU 101 executes the error processing (Step S18) and ends the initialization processing thereafter. At the Step S16, if the CPU 301 succeeds in getting the individual identification information (Step S16: Y), the CPU 301 transmits the individual identification information which is read from the Flash memory 208 as a status to the CPU 101. Then, the CPU 101 starts usual operation (Step S17) and ends the initialization processing.

Here, the cross certification processing at the Step S13 is performed every time when the power is turned ON. This is because the certification result of the cross certification is validated only while the current is carried. Moreover, the CPU 101 which gets the individual identification information by the GI command 613 stores the individual identification information in the Flash memory 210 of the board A 112 which is connected to the control apparatus 122 as described in FIG. 2. The board A 112 is mounted to a hidden position where is not easily removed.

Figure 10:
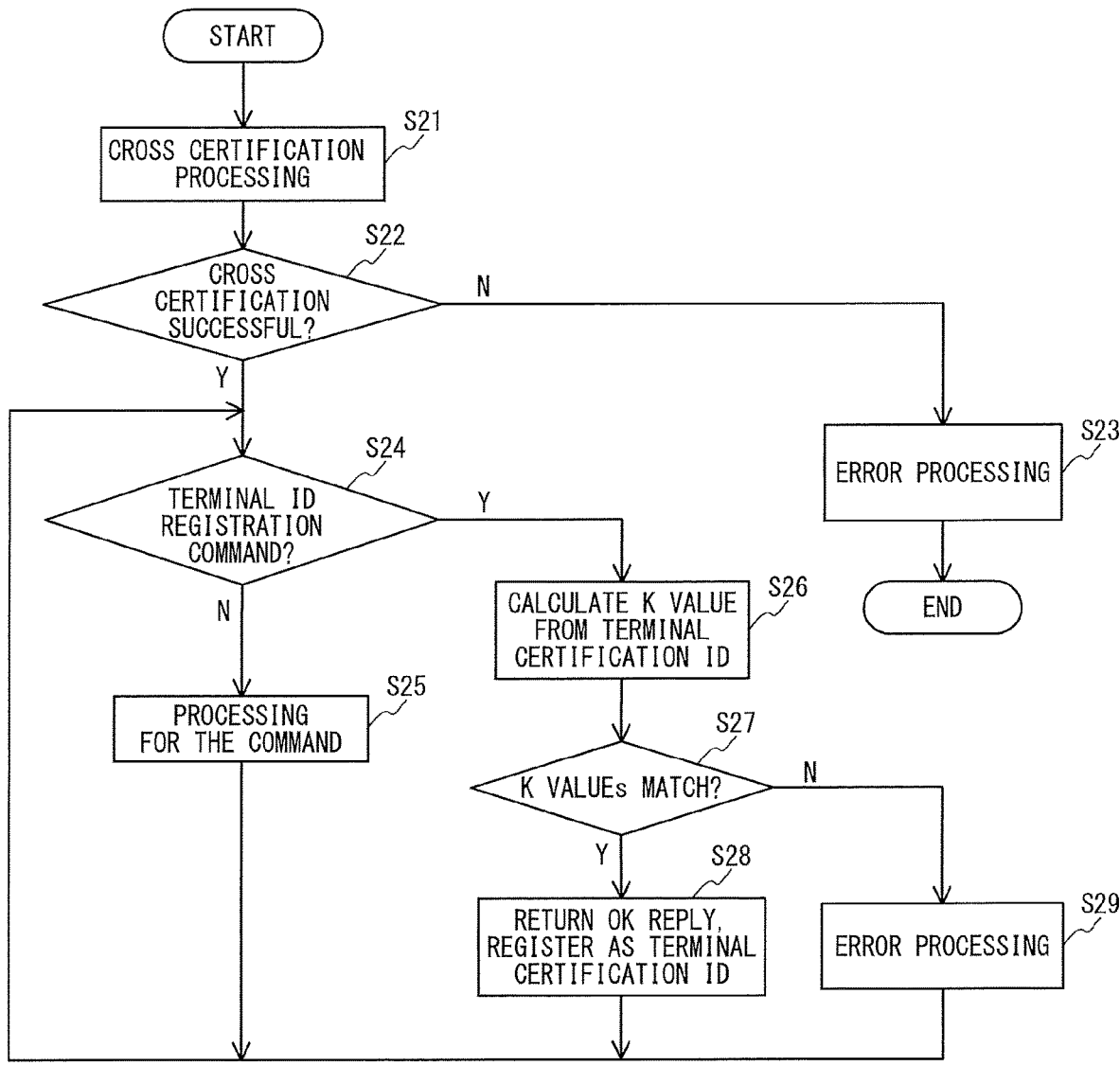
FIG. 10 is a diagram for explaining procedures of terminal certification ID registration processing.

Next, a description is provided with regard to registration processing of a terminal certification ID for receiving the external access. FIG. 10 is a diagram for explaining procedure performed by the CPU 301. The processing is based on the execution of the cross certification processing as described at the Step S13 in FIG. 9. If the cross certification processing fails (Step S22: N), the CPU 301 executes the error processing (Step S23) and ends the registration processing. The error processing is processing through which the CPU 301 transmits failure of the terminal certification ID registration as a status to the CPU 101. The CPU 301 also blocks the SATA-IF 202 from the HDD 115 and HDD 116.

If the cross certification processing is successful (Step S22: Y), the CPU 301 enables to get (obtain) the command. In a case where the command obtained is not the registered command (Step S24: N), the CPU 301 performs processing for the command obtained (Step S25). If the command obtained at the Step S24 is the registered command, it means that, as shown in FIG. 7, the CPU 101 sets the appropriate certification ID candidate and the K value (the first unique value) in the RT command 610 and transmits this to the CPU 301. In this case (Step S24: Y), the CPU 301 functions as an obtaining unit which obtains the registration command of the certification ID candidate.

Thereafter, the CPU 301 independently calculates the K value based on the certification ID candidate obtained. The K value which is independently calculated is called a second unique value. To calculate the K value to be the second unique value, the CPU 301 reads the individual identification information which is obtained at the Step S15 and stored in the Flash memory 208. The K value is obtained by coupling and calculating the individual identification information and the terminal certification ID. A person with no authority does not know the individual identification information, meaning that such person cannot calculate the K value.

When the K value to be the second unique value is calculated, the CPU 301 compares this value with the K value which is the first unique value set in the RT command 610. If the K values do not match (Step S27: N), the CPU 301 executes the error processing (Step S29). Thereafter, the CPU 301 returns to the Step S24 again and enters into a command standby state. At the Step S27, if the K values do match (Step S27: Y), the CPU 301 recognizes the certification ID candidate as the terminal certification ID. Then, the CPU 301 stores the terminal certification ID in the Flash memory 208 which is the functional component. It means that the CPU 301 functions as a registration unit of the terminal certification ID. Thereafter, the CPU 301 returns OK reply representing completion of registration to the CPU 101 and returns to the Step S24 again.

Figure 11:
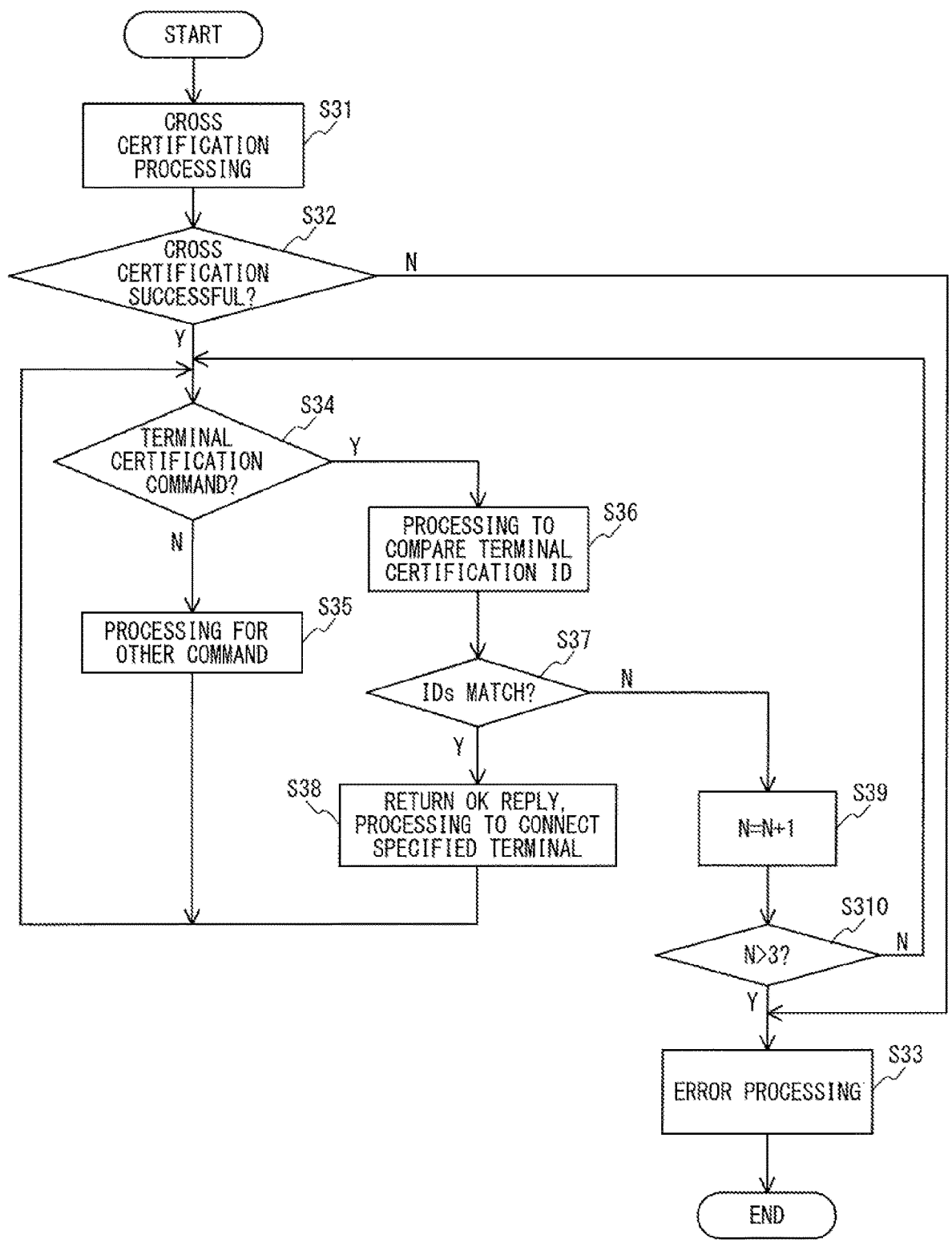
FIG. 11 is a diagram for explaining procedures of certification processing after the terminal certification ID is registered.

Next, referring to FIG. 11, a description is provided with regard to procedure of certification processing after the completion of registration. The CPU 301 performs the certification processing. The CPU 301 performs the cross certification processing as described in the Step S13 (Step S31). If the cross certification processing fails (Step S32: N), the CPU 301 executes the error processing (Step S33) and ends the processing thereafter. Moreover, the CPU 301 blocks the SATA-IF 202 from the HDD 115 and HDD 116. At the Step S32, if the cross certification processing is successful (Step S32: Y), the CPU 301 starts to receive the command from the controller IC 201. If the received command is not the terminal certification command (Step S34: N), the CPU 301 executes other command processing (Step S35). Thereafter, the CPU 301 returns to the Step S34.

At the Step S34, if the received command is the terminal certification command, it means that the CPU 301 sets the certification ID candidate in the CT command 611 and transmits this to the CPU 301 so that the certification ID candidate is already registered as the terminal certification ID. If the terminal certification command accompanying the certification ID candidate is obtained, the CPU 301 functions as the certification unit. In this case (Step S34: Y), the CPU 301 reads the set certification ID candidate and the terminal certification ID stored in the Flash memory 208 by the CPU 301. Then, the CPU 301 performs processing to compare the certification ID candidate and the terminal certification ID (Step S36). If the IDs do match (Step S37: Y), the CPU 301 shifts the state of the external interface which corresponds to the terminal certification ID and the internal functional components and the like, which are in the non-coupled state, to the coupled state. Thereafter, the CPU 301 initializes (=0) an accumulated value N which is described later and transmits success of the external terminal certification (the certification result shows validity) as a status to the CPU 101. That is, the CPU 301 returns OK reply (Step S38). Thereafter, the CPU 301 returns to the Step S34 and enters into the command standby state.

At the Step S37, if the IDs do not match (Step S37: N), the CPU 301 transmits, as the error processing, that the certification result is invalid as a status to the CPU 101. Moreover, the CPU 101 accumulates number of times that the certification result is determined invalid. It means that the CPU 301 performs count up of "N=N+1" (Step S39). Then, the CPU determines whether the accumulated value N exceeds the upper limit number of times which is previously set or not (Step S310). The upper limit number of times is a number which is set to defend against all search attack, i.e., the external terminal certification repeatedly performed by a person with no authority. In this embodiment, the upper limit number of times is three or less. The upper limit number of times is set in the SU command 606. If the upper limit number of times does not exceed three (Step S310: N), the CPU 301 returns to the Step S34 again and enters into a receiving command standby state.

At the Step S310, if the accumulated value N exceeds the upper limit number of times (three times) (Step S310: Y), the CPU 301 avoids the further certification of the external access to the access source. In particular, by blocking the SATA-IF-202, the command transfer is disabled. Moreover, the CPU 101 executes the appropriate error processing (Step S33) and ends the processing. Though not shown here, the operation may be continued by performing re-certification of the cross certification. Note that the external terminal may be coupled to the internal functional resource for a limited period. For example, the external terminal may be coupled to the internal functional resource while the printing apparatus is powered ON and after the printing apparatus is powered OFF, the external terminal certification processing as described in FIG. 10 may be performed again.

In the security IC 114, in a development stage before it is commercialized, the Fuse 402 is put in a normal state (a first state). Also, in a stage of test writing to the Flash memory 208 inside the IC and in a shipping test stage, the Fuse 402 is put in the normal state. Thus, the external interface and the internal functional component are made into the coupled state. After the security IC 114 is commercialized, the Fuse 402 is physically blocked so that the external interface and the internal functional component are made into the non-coupled state. Thereafter, as long as the result of the certification processing using the external terminal ID maintains validity, the coupled state is maintained. This period, i.e., while the coupled state is maintained, can be used to quickly analyze the fault of the product. Note that, in this embodiment, Fuse 402 is used as the irreversible unit, however, other unit with equivalent property may be used. Moreover, in this embodiment, a case using one Fuse 402 is described. It is needless to say, one or more Fuses 402 may be used.

In the above embodiment, the description is provided with regard to a case where the external terminal ID is used as the certification ID for identifying the external interface to be received. However, in the other embodiment, the certification ID for identifying the first interface may be used. Moreover, in the above embodiment, the description is provided with regard to a case where the controller IC 201 and the security IC 114, which respectively are the functional devices mounting IC, are mounted on the control apparatus 122. In other embodiments, these IC mounted devices may be mounted in one package.

According to the above mentioned embodiment, even the unauthorized person attempts to access the secret information stored in the internal functional components through the external interface, such access can surely be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-237803, filed Dec. 4, 2015 which is hereby incorporated by reference herein in its entirety.

What is claimed is:

1. A functional device having at least a memory device, comprising:
   an external interface constructed for connection to an external device;
   a first interface which is conducted with the external interface;
   a second interface which is conducted with the memory device;
   a controller interposed between the first interface and the second interface;
   a fuse configured to output a first value before blown and output a second value after blown;
   a register configured to store the first value in a case where a certification based on a certification command is succeeded, and to store the second value in a case where the certification based on the certification command is failed;
   wherein the controller includes a binary circuit,
   wherein the binary circuit is connected to the fuse and the register, wherein the first value and the second value are input to the binary circuit from the fuse, and the first value and the second value are input to the binary circuit from the register, wherein the binary circuit outputs a signal which controls whether or not to conduct between the first interface and the second interface based on the input values;
   wherein conduction is achieved between the first interface and the second interface in a case where the first value is input from the fuse to the binary circuit;
   wherein conduction is achieved between the first interface and the second interface in a case where the second value is input to the binary circuit from the fuse and the first value is input to the binary circuit from the register,
   wherein conduction is not achieved between the first interface and the second interface in a case where the second value is input to the binary circuit from the fuse and the second value is input to the binary circuit from the register, and
   wherein the first value based on the certification result is validated while current is carried to the functional device, and the first value is reset when the current carried to the functional device is stopped.

2. The functional device according to claim 1,
   wherein the binary circuit outputs a signal having the first value in a case where the predetermined certification processing is successful and otherwise turns the value of the signal into the second value which is different from the first value, and
   wherein the controller turns the first interface and the second interface into a coupled state in which the first interface is conducted with the second interface for a first period during which the binary circuit outputs the signal having the first value and turns the first interface and the second interface into a non-coupled state, for a period other than the first period, in which the first interface and the second interface are physically blocked except for the period.

3. The functional device according to claim 2,
   wherein the first interface includes at least one of an input buffer for informing the memory device of an external access from the external interface, an output buffer for informing the external interface of information from the memory device, and a bidirectional buffer for performing bidirectional information transfer between the external interface and the memory device, and
   wherein the controller stops any operation of all buffers using the signal in a case where the binary circuit does not output the first value signal.

4. The functional device according to claim 2, further comprising a second memory device different from said memory device, wherein the first interface includes an external input terminal and an external output terminal which respectively are conducted with the external interface,
   a multiplexer, wherein the multiplexer determines which input signal, an input signal from the external input terminal or an input signal from the memory device, to be transmitted to the second memory device, and
   a demultiplexer, wherein the demultiplexer determines one of an external output terminal or the memory device to be a destination of an output signal from the second memory device, and
   wherein the controller stops operation of the multiplexer and the demultiplexer in a case where the binary circuit outputs the second value signal.

5. The functional device according to claim 2, further comprising:
   a third interface which is conducted with an external device,
   wherein the controller turns the first interface and the third interface into the coupled state for a period during which the binary circuit outputs the first value signal and otherwise turns the first interface and the third interface into the non-coupled state.

6. The functional device according to claim 5, wherein the binary circuit outputs the first value signal for a period during which a certification result of the external access maintains validity.

7. The functional device according to claim 6,
   wherein the memory device stores a certification ID for identifying the external interface for receiving the external access or the first interface, and
   wherein certification using the certification ID to the external access is performed.

8. The functional device according to claim 6, further comprising storage of individual identification information which is unique to the functional device,
   wherein the controller operates to:
   obtain a registration command having a certification ID candidate and a first unique value, derive a second unique value based on the certification ID candidate obtained and the individual identification information, compare the derived second unique value with the first unique value, and in a case where the first unique value matches with the derived second unique value, store the certification ID candidate in the memory device as the certification ID.

9. The functional device according to claim 8,
wherein cross certification of the external access using the individual identification information is performed and obtaining the registration command is enabled in a case where the cross certification is successful.

10. The functional device according to claim 9,
wherein the number of times that the certification result of the cross certification is determined invalid is accumulated and in a case where an accumulated value exceeds an upper limit number of times which is previously set, further certification of the external access to an access source is avoided.

11. The functional device according to claim 1,
wherein with respect to individual identification information which is unique to the functional device, and wherein with respect to a registration command obtained by the processor and having a certification ID candidate and a first unique value, a second unique value is derived based on the certification ID candidate and the individual identification information, and
wherein the predetermined certification processing is successful in a case where the first unique value matches with the second unique value.

12. The functional device according to claim 1, wherein the processor executes the instructions to further control the controller to:
obtain a registration command having a certification ID candidate and a first unique value,
derive a second unique value based on the certification ID candidate obtained and individual identification information which is unique to the functional device, compare the derived second unique value with the first unique value, and in a case where the first unique value matches with the derived second unique value, store the certification ID candidate in the first memory device as the certification ID.

13. The functional device according to claim 1,
wherein the external device is an external memory control device, and
wherein the first memory device is shielded from direct access by the external memory control device, through use of the controller.

14. A control apparatus, comprising:
a functional device having a at least a first memory device and a second memory device, the functional device comprising:
an external interface constructed for connection to an external device;
a first interface which is conducted with the external interface;
a second interface which is conducted with the first memory device;
a first controller interposed between the first interface and the second interface;
an encryption decryption section which performs encryption or decryption processing using a program, which is stored in the first memory device and is to be used in the encryption or decryption processing; and
a processor which executes instructions,
wherein the processor stores data decrypted by the encryption decryption section into the second memory device and controls the first controller to physically conduct between the first interface and the second interface in a case where predetermined certification processing is successful;
wherein the controller includes a binary circuit which outputs a first value signal in a case where the predetermined certification processing is successful and otherwise turns the signal into a second value which is different from the first value, and
wherein the processor executes the instructions to further control the controller to turn the first interface and the second interface into a coupled state in which the first interface is conducted with the second interface for a first period during which the binary circuit outputs the first value signal and turn the first interface and the second interface into a non-coupled state, for a period other than the first period, in which the first interface and the second interface are physically blocked except for the period;
a third interface which is conducted with an external device,
wherein the processor executes the instructions to further control the controller to turn the first interface and the third interface into the coupled state for a period during which the binary circuit outputs the first value signal and otherwise turn the first interface and the third interface into the non-coupled state;
wherein the processor executes the instructions to control the binary circuit to output the first value signal for a period during which certification result of the external access maintains validity; and
a memory configured to hold individual identification information which is unique to the functional device,
wherein the processor executes the instructions to further control the controller to:
obtain a registration command having a certification ID candidate and a first unique value,
derive a second unique value based on the certification ID candidate obtained and the individual identification information, compare the derived second unique value with the first unique value, and in a case where the first unique value matches with the derived second unique value, store the certification ID candidate in the first memory device as the certification ID,
wherein, in addition to the functional device as defined above, the control apparatus further comprises:
a second controller which is connected to the functional device through the external interface; and
at least one second processor, which are accommodated in one package,
wherein the second processor executes the instructions to control the second controller to transmit the registration command to the functional device to enable information transfer with the functional device.

15. The control apparatus according to claim 14,
wherein the second processor executes the instructions to further control the second controller to transmit the registration command by giving a predetermined definition to an expansion command in accordance with a protocol of a SATA standard.

\* \* \* \* \*